(12) United States Patent
Goldberg

(10) Patent No.: US 8,903,850 B2
(45) Date of Patent: Dec. 2, 2014

(54) METADATA INGESTION TO STREAM CUSTOMIZATION

(75) Inventor: Scott E. Goldberg, Venice, CA (US)

(73) Assignee: Myspace LLC, Los Angeles, CA (US)

( * ) Notice: Subject to any disclaimer, the term of this patent is extended or adjusted under 35 U.S.C. 154(b) by 172 days.

(21) Appl. No.: 13/189,383

(22) Filed: Jul. 22, 2011

(65) Prior Publication Data

US 2012/0041972 A1    Feb. 16, 2012

Related U.S. Application Data

(60) Provisional application No. 61/366,775, filed on Jul. 22, 2010.

(51) Int. Cl.
*G06F 17/30* (2006.01)

(52) U.S. Cl.
CPC .................. *G06F 17/30867* (2013.01)
USPC .................. 707/769; 707/E17.014

(58) Field of Classification Search
CPC .......... G06F 17/30766; G06F 17/30029; G06F 17/30699; G06F 17/30772; G06F 3/0482; G06F 17/3084; G06F 17/30761; G06F 17/30867; G06F 17/30035; G06F 17/30861; G06F 17/30864; G06F 17/3053
See application file for complete search history.

(56) References Cited

U.S. PATENT DOCUMENTS

| | | | |
|---|---|---|---|
| 7,778,945 B2 * | 8/2010 | Gunawardana et al. | 706/14 |
| 8,024,431 B2 * | 9/2011 | Hoffman | 709/220 |
| 8,060,525 B2 * | 11/2011 | Svendsen et al. | 707/769 |
| 8,583,674 B2 * | 11/2013 | Zheleva et al. | 707/767 |
| 2006/0080103 A1 * | 4/2006 | Van Breemen | 704/270 |
| 2007/0208751 A1 | 9/2007 | Cowan et al. | |
| 2008/0016205 A1 * | 1/2008 | Svendsen | 709/224 |
| 2008/0243733 A1 * | 10/2008 | Black | 706/16 |
| 2009/0049045 A1 * | 2/2009 | Askey et al. | 707/7 |
| 2009/0083117 A1 * | 3/2009 | Svendsen et al. | 705/10 |
| 2009/0119294 A1 * | 5/2009 | Purdy et al. | 707/7 |
| 2009/0164516 A1 | 6/2009 | Svendsen et al. | |
| 2010/0138491 A1 | 6/2010 | Churchill et al. | |
| 2010/0153175 A1 | 6/2010 | Pearson et al. | |
| 2010/0251141 A1 * | 9/2010 | Sabin et al. | 715/758 |
| 2010/0268574 A1 * | 10/2010 | Butcher et al. | 705/10 |

OTHER PUBLICATIONS

International Search Report mailed Sep. 16, 2011, International application No. PCT/US11/45105, International filing date Jul. 22, 2011.

* cited by examiner

*Primary Examiner* — Michelle Owyang
(74) *Attorney, Agent, or Firm* — Gates & Cooper LLP

(57) ABSTRACT

A method, apparatus, system, article of manufacture, and computer-readable storage medium provide for the ingestion of personalized information to provide customization. A request to customize a user's interactive experience on a website or application is received from a user. Personalized information based on a user's activities is ingested. The user activities are independent from activities on the website or application. A database is searched based on the personalized information and search results are produced. The user's interactive experience is customized based on the search results.

12 Claims, 3 Drawing Sheets

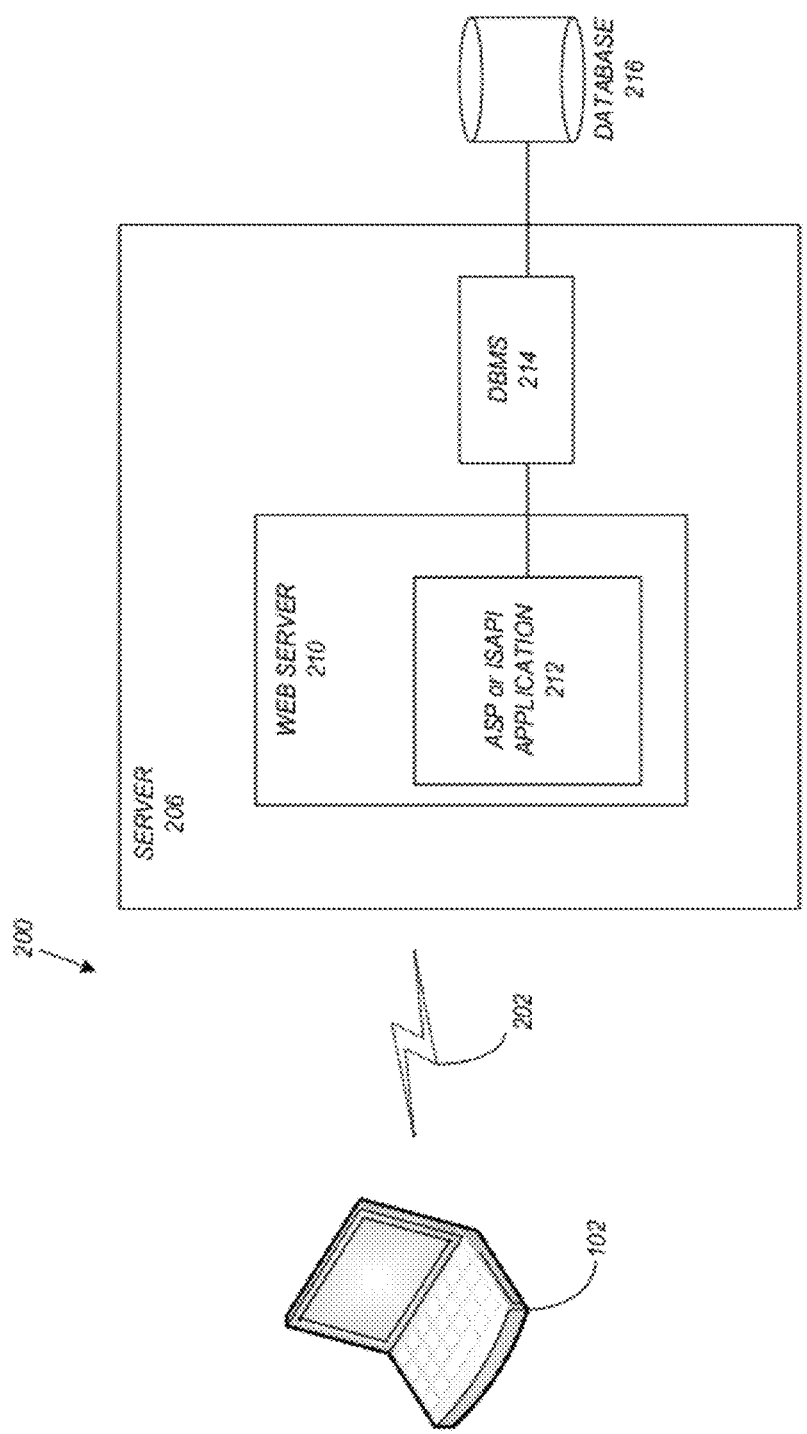

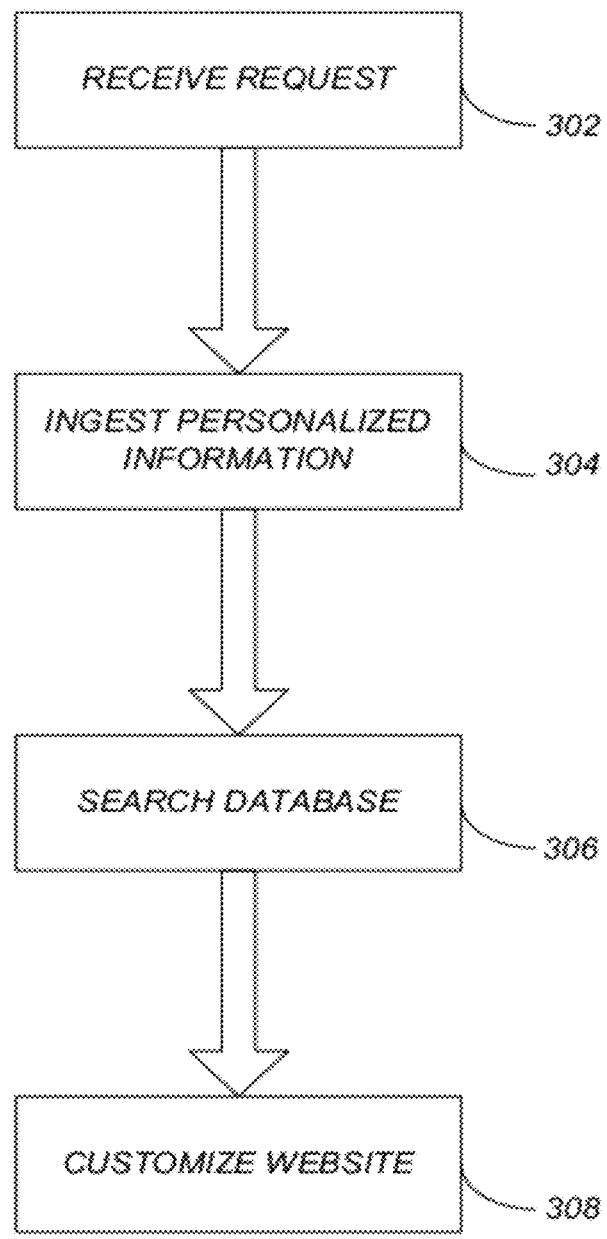

METADATA INGESTION TO STREAM CUSTOMIZATION

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

U.S. Provisional Patent Application Ser. No. 61/366,775, filed on Jul. 22, 2010, entitled "METADATA INGESTION TO STREAM CUSTOMIZATION" by SCOTT E. GOLDBERG.

BACKGROUND OF THE INVENTION

1. Field of the Invention

The present invention relates generally to customizing data streamed to a user, and in particular, to a method, apparatus, and article of manufacture for ingesting a user's personal information/preferences and automatically returning a customized stream/experience based thereon.

2. Description of the Related Art

Portable music players (e.g., iPods™, iPhone™, MP3 players, etc.) have been adopted and used by users throughout the world. Similarly, social networking sites such as MySpace™ and Facebook™ have become increasingly popular. It is desirable to provide a new or existing user on a social networking site with a customized experience based on the user's interests with little to no effort by the user (i.e., irrespective of the user's activities on the social networking site). Prior art mechanisms fail to provide an easy and efficient mechanism for a user to create a personalized network on a social networking site that is customized based on the user's preferences with minimal user effort. Such problems may be better understood with an explanation of prior art portable music devices and social networking sites.

Social networking sites each have their own unique user interface, terminology, preferences, etc. In addition, once a user has selected a social networking site, the user becomes increasingly invested in the selected site through usage of the site. It is difficult to get the user to switch to an alternative social network once a user has become invested in a particular site. As a result, significant competition exists (between social networking sites) to entice both initial users and users of alternative social networks. To entice users, social networks attempt to simplify and ease the adoption process while also customizing the content for a particular user in a transparent/semi-transparent manner.

Prior art methods provide no capability to customize content (with minimal user effort) without use of the social network itself by the user. For example, to customize content, prior art systems may present a series of questions to a user (e.g., marital status, likes/dislikes, preferred music type/category, etc.). In addition, to provide recommendations (e.g., music, movies, food, products, advertising, etc.) to such users (that are particularly relevant and customized for that user) requires significant use of the social network itself by the user. The more time the user spends on a social network, the more customized the information becomes that is displayed to the user. Accordingly, there is no capability to provide initial customization or continued customization on user's preferences that are unrelated to the time spent on the social network itself.

Such customization may take various forms depending on the social network utilized. For example, on the MySpace™ social networking site, particular advertisements, featured games, and news may be displayed. Additionally, various artists/musicians may be displayed and news relating to a user's friends/identified musicians may be displayed (e.g., via an "activity stream" for a defined category such as friends, status, photos, music, bulletins, videos, links, apps, blogs, events, etc.). In this regard, an "activity stream" shows what a user's friends are doing (such as recent photo updates and photo uploads). One major task with using a new social network is that of identifying "friends" on the social network. Further, a user may be very interested in music and would like to have bands of interest identified for him/her without having to spend a significant amount of time on the social network. Prior art mechanisms fail to provide such customization without a significant investment of time by the user utilizing the social network itself.

In conjunction with the above, prior art mechanisms fail to integrate and/or utilize a user's preferences (i.e., based on data external from and independent from social networking site data) on a social networking site. In this regard, a user may have many preferences or may have established profiles independent from social network site data. For example, a user may have a media viewing/listening device (e.g., MP3™ player, cellular phone, personal digital assistant [PDA], computer, iPod™, iPad™, Nook™, etc.) that is frequently used by the user. Personalized information about the user may be captured by software based on the music player. For example, a media player application (e.g., iTunes™, Windows™ Media Player™, QuickTime™, Android Market™, etc.) may store information about the user's viewing/listening preferences. Such information may include for example, the content of a user's music library, last song played, songs most played, type of movie watched, etc. may be stored. However, such personalized information is not utilized by social networking sites to customize their website experience.

Alternatively, websites frequented by a user may also have a profile for such a user. Such profile information may include books purchased (e.g., via Amazon™, BarnesNNoble™, etc.), movies rented/watched (e.g., via Netflix™). Further yet, information about the user's location (e.g., via global positioning system [GPS]) may be stored by cellular phone companies, in a user's cellular phone (or other GPS device). In this regard, a variety of types of personalized/customized information for a user may be available from a variety of sources. However, prior art methodologies do not utilize nor access such information to provide a customized user experience on a social networking site.

In view of the above, what is needed is an efficient and easy mechanism to utilize a user's preferences/personalized information to customize data and information displayed on a social networking site.

SUMMARY OF THE INVENTION

Embodiments of the invention overcome problems of the prior art by ingesting personalized information (e.g., metadata from a user's music library) and compare such personalized information to a database of information pertaining to already known/existing users of the social network (e.g., a database of artists with profiles on the social network). Based on the search results, a customized stream/website may be presented to the user (e.g., by automatically "friending" matching artists to the user). Such customization increases the attraction to both adopt and continue using a particular social network as there is no need to spend an exorbitant amount of time utilizing the social network to develop and mature the user's interests/friends/customization of the website.

BRIEF DESCRIPTION OF THE DRAWINGS

Referring now to the drawings in which like reference numbers represent corresponding parts throughout:

FIG. 2 schematically illustrates a typical distributed computer system using a network to connect client computers to server computers 206 in accordance with one or more embodiments of the invention; and FIG. 3 illustrates the logical flow for ingesting personalized information to provide customization in accordance with one or more embodiments of the invention.

DETAILED DESCRIPTION OF THE PREFERRED EMBODIMENTS

Figure 1:
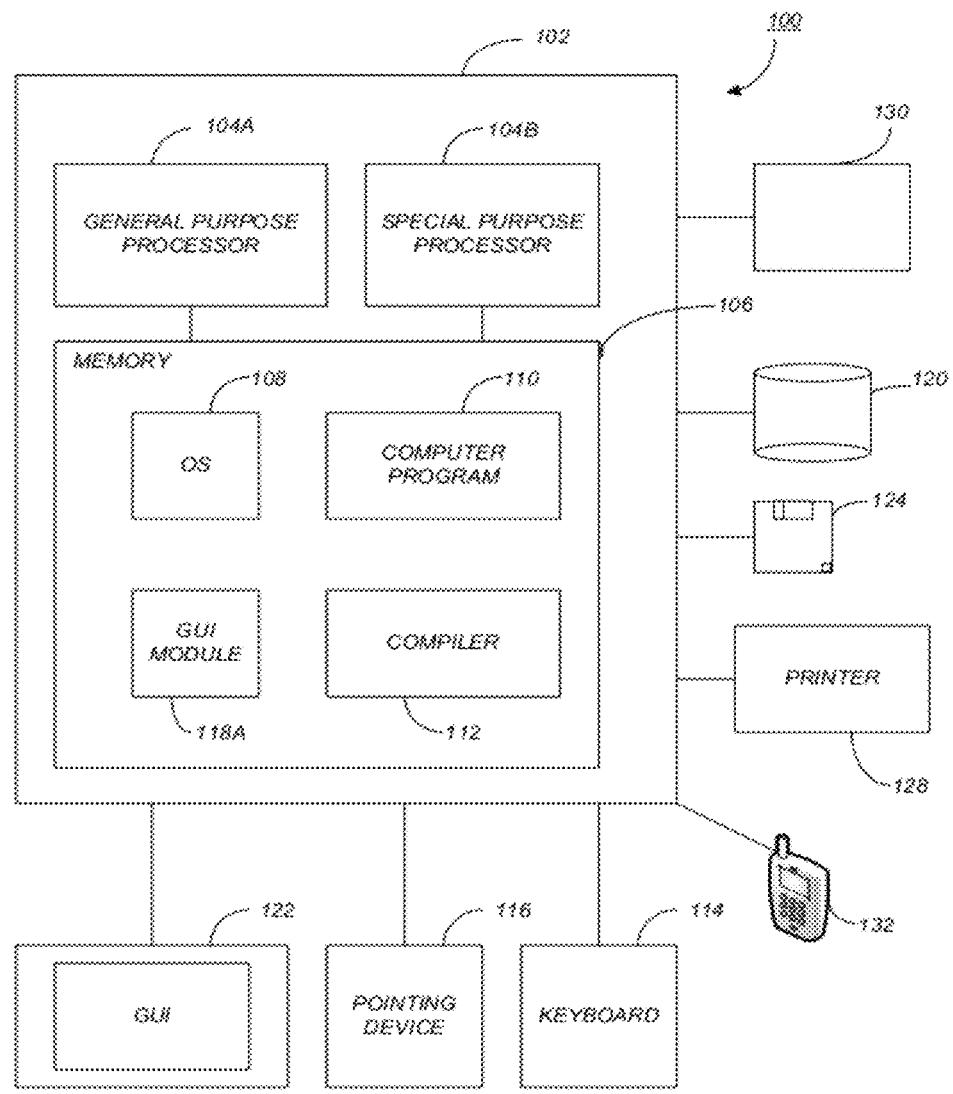
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Overview Embodiments of the invention create a quick and accurate personally relevant social Internet experience based on a user's prior actions/preferences. More specifically, a native library (e.g., music, games, film, media content, etc.) in user's media content device/application (e.g., Android™ or iPhone™ devices) is read and a "batch search" of the information in the library is conducted against a database of profiles (e.g., artist profiles) (e.g., maintained by a social network website such as Facebook™, MySpace™, LinkedIn™, etc.). Based on the batch search, a stream of content customized specifically for that individual is returned. In this regard, the customized content may serve to find/assign "friends" to a user. Such "friends" may not be standard "friends" that the user has explicitly requested but may be modified or "assigned" friends that have different attributes/properties associated therewith (within a social network website).

Such an approach reduces the difficulties of joining a new social network while customizing a social experience entirely to the user's interests with minimal effort on the user's part.
Hardware Environment FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to/integrated with other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to or may comprise a portable or media viewing/listening device 132 (e.g., an MP3 player, iPod™, Nook™, portable digital video player, cellular device, personal digital assistant, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of a multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 208-218 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include thin client devices with limited or full processing capabilities, portable devices such as cell phones, notebook computers, pocket computers, multi-touch devices, and/or any other device with suitable processing, communication, and input/output capability.

Of course, those skilled in the art will recognize that any combination of the above components, or any number of different components, peripherals, and other devices, may be used with computers 102 and 206.

Software Embodiments

Embodiments of the invention are implemented as a software application on a client 102 or server computer 206. The software application first reads, or is provided with, a user's personalized information (e.g., in the form of metadata). For example, a native music library on a music listening device 132 (i.e., metadata for such a music library) may be read or provided to the software application. Such metadata may be stored and read from the device 132 itself or may be provided via an application configured for the device 132 or the computer 102 (e.g., an iTunes™ application or Windows™ Media Player™ application). Certain applications provide such metadata access to users (e.g., iPhone™/Apple™ iOS™ based applications and/or Android™ based applications). Such personalized information may include a variety of metadata for a particular user. For example, the metadata may indicate the last song played by the user (whether on the device 132 or the computer 102), a listing of artists on the user's playlist, the number of times a song has been played by the user, etc.

Once the personalized information has been obtained, a batch search is conducted of the personalized information against a database 216. In a MySpace™ social network, such a database 216 may contain artist profiles and music for a variety of bands/musicians that have MySpace™ pages. Accordingly, the batch search compares the personalized data to the MySpace proprietary (or non-proprietary) information. For example, the batch search may search the database 216 to find corresponding artists (in the database 216) from the artists in a user's personal music library. Various filters may also be utilized during the batch search. For example, a filter may provide that the batch search will only search the database 216 for artists that have two or more songs in the user's personal music library.

The results of the batch search are then utilized to customize a user's social experience on the website. For example, an activity stream may have content that is customized specifically for that individual based on the batch search results. As another example, those artists identified during the batch search may be automatically added as "friends" or recommended as "friends" to the user. In such embodiments, if automatically added as "friends", such friends may exist within a different category of "friends" having a different set of attributes/properties than that of a user's explicitly added friends. The user may also have the option of upgrading such a modified friend to a "standard" friend category. Attributes associated with such a modified friend may include the ability to view the modified friend's profile but not vice versa or any other type of customization or privacy settings desired by the user.

Based on the above, there is minimal effort by the user to initially adopt or switch to a social network enabled in accordance with embodiments of the invention. Similar practices may be provided wherever metadata is available with personalized user information and profiles that match (or are capable of matching) such metadata. In this regard, games, films, television programs, etc. could all potentially utilized to provide a customized social experience to a user.

Logical Flow

FIG. 3 illustrates the logical flow for ingesting personalized information to provide customization in accordance with one or more embodiments of the invention. At step 302, a request is received, from a user, to customize the user's interactive experience on a website or application. Such a request may be in the form of requesting an account at a social network site, authorization to view personalized information (e.g., a play list or music library), etc. Further, such a request may be directly authorized by the user or may be performed automatically by the user's computer without knowledge of the user.

At step 304, personalized information that is based on the user's activities are ingested. Such user activities are independent from activities on the social network website/application itself. Further, the personalized information may be in the form of metadata (e.g., information pertaining to a music library of the user). In addition, the ingested information may be prioritized (e.g., based on the number of songs per artist, the number of times played, the most recently played song, etc.).

At step 306, a database is searched based on the personalized information to produce search results. As an example, if the metadata is information pertaining to a music library, the database may be a database of artists that is searched for artists identified in the music library. Alternatively, artists that are similar to or have a profile similar to that of the user's preferences may be part of the search results. Additional search results may be based on a combination of the user's preferences and preferences of other users that also like the same/similar artists.

At step 308, the user's interactive experience (e.g., on a website, an application, a device, etc.) is customized based on the search results. Such customization may include automatically providing (without additional user input and/or independent from any further user input), a customized activity stream to the user. Such a customized activity stream may consist of a recommendation for one or more friends to the user based on the search results. Alternatively, artists may be automatically added to a user's profile or friend list (or a status similar to "friends").

In view of the above, and in an exemplary environment, various actions may be executed when an application (configured in accordance with embodiments of the invention) is opened. A software development kit (SDK) (e.g., Apple™ SDK), may allow the invention's application to essentially "speak" to a music library (e.g., iTunes™ library) on a user's device (e.g., MP3 player, computer, cellular device, etc.). The application may be configured to literally read the library and view all of the metadata present (e.g., bands and artists, song titles, last song listened to, etc.). The application examines various portions of the metadata such as the artists and number of song titles per artist. Lists may be filtered such that any artists with only one (1) song title listed may be disregarded as such artists do not demonstrate the true affinity between the user and that artist. The list of artists remaining may then be searched against a database of artists (referred to as a "batch search"). An activity stream can be compiled that is similar to a regular friend activity stream. However, an activity stream of the invention may not officially "friend" matching artists but may consume activities as if they are.

Accordingly, embodiments of the invention provide a significant leap in the way user activity is surfaced to end users because it eliminates the time and effort spent forming a network (in the above example, a network of artists) and completely customizes the website/activity stream to the user's tastes, that will in turn make the stream more relevant, and create more interest in using the product/website more frequently. Thus, embodiments of the invention assist social networks in attracting and keeping new users more easily, as the barrier to adopting/becoming a user of a particular social network is reduced and the customization of the experience will be unmatched by competitors.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for ingesting personalized information to provide customization, comprising:
   receiving a request, from a user, to customize a user's interactive experience on a social network website or social network application;
   ingesting personalized information based on a user's activities, wherein:
   the user activities are independent from activities on the social network website and the user activities are independent from activities on the social network application;

the personalized information comprises metadata regarding the user activities with respect to a native music library on a user device; and the metadata comprises a last song played by the user on the user device, a listing of artists on a playlist of the user, and a number of times a song has been played by the user;

batch searching a database based on the personalized information to produce search results, wherein:

the database comprises artist profiles and music; and the batch searching compares the metadata to the artist profiles and music based on threshold values; and customizing the user's interactive experience on the social network website or social network application based on the search results, wherein the user's interactive experience comprises recommending one or more friends to the user based on the search results and providing a customized activity stream that shows activity updates for the recommended one or more friends of the user;

wherein:

explicitly added friends that are explicitly added by the user are associated with a standard category of friends;

the recommended one or more friends are automatically added as friends of the user;

the automatically added friends exist within a different category of friends from the standard category; and a user enabled option provides for upgrading the different category of friends to the standard category of friends.

2. The computer-implemented method of claim 1, further comprising prioritizing the ingested personalized information.

3. The computer-implemented method of claim 1, wherein:

the database comprises a database of artists; and the database is searched for artists identified in the music library of the user.

4. The computer-implemented method of claim 1, wherein the customizing comprises automatically providing, without additional user input, the customized activity stream to the user.

5. An apparatus for ingesting personalized information to provide customization in a computer system comprising:

(a) a computer having a memory;

(b) a database controlled by the computer; and (c) an application executing on the computer, wherein the application is configured to:

(i) receive a request to customize a user's interactive experience on a social network website or social network application;

(ii) ingest personalized information based on a user's activities, wherein:

(1) the user activities are independent from activities on the social network website and the user activities are independent from activities on the social network application;

(2) the personalized information comprises metadata regarding the user activities with respect to a native music library on a user device; and (3) the metadata comprises a last song played by the user on the user device, a listing of artists on a playlist of the user, and a number of times a song has been played by the user;

(iii) batch search the database based on the personalized information to produce search results, wherein:

(1) the database comprises artist profiles and music; and (2) the batch searching compares the metadata to the artist profiles and music based on threshold values; and (iv) customize the user's interactive experience on the social network website or social network application based on the search results, wherein the user's interactive experience comprises recommending one or more friends to the user based on the search results and providing a customized activity stream that shows activity updates for the recommended one or more friends of the user;

wherein:

explicitly added friends that are explicitly added by the user are associated with a standard category of friends;

the recommended one or more friends are automatically added as friends of the user;

the automatically added friends exist within a different category of friends from the standard category; and a user enabled option provides for upgrading the different category of friends to the standard category of friends.

6. The apparatus of claim 5, wherein the application is further configured to prioritize the ingested personalized information.

7. The apparatus of claim 5, wherein:

the database comprises a database of artists; and the database is searched for artists identified in the music library of the user.

8. The apparatus of claim 5, wherein the application is configured to customize by automatically providing, without additional user input, the customized activity stream to the user.

9. A non-transitory computer-readable medium storing computer program instructions which when accessed by a computer cause the computer to load the program instructions to a memory therein creating a special purpose data structure causing the computer to operate as a specially-programmed computer, executing a method of ingesting personalized information to provide customization, comprising:

(a) receiving a request to customize a user's interactive experience on a social network website or social network application;

(b) ingesting personalized information based on a user's activities, wherein:

(1) the user activities are independent from activities on the social network website and the user activities are independent from activities on the social network application;

(2) the personalized information comprises metadata regarding the user activities with respect to a native music library on a user device; and (3) the metadata comprises a last song played by the user on the user device, a listing of artists on a playlist of the user, and a number of times a song has been played by the user;

(c) batch searching a database based on the personalized information to produce search results, wherein:

(1) the database comprises artist profiles and music; and (2) the batch searching compares the metadata to the artist profiles and music based on threshold values; and (d) customizing the user's interactive experience on the social network website or social network application based on the search results, wherein the user's interactive experience comprises recommending one or more friends to the user based on the search results and providing a customized activity stream that shows activity updates for the recommended one or more friends of the user;

wherein:

explicitly added friends that are explicitly added by the user are associated with a standard category of friends;

the recommended one or more friends are automatically added as friends of the user;

the automatically added friends exist within a different category of friends from the standard category; and a user enabled option provides for upgrading the different category of friends to the standard category of friends.

10. The non-transitory computer-readable medium of claim 9, further comprising prioritizing the ingested personalized information.

11. The non-transitory computer-readable medium of claim 9, wherein:

the database comprises a database of artists; and the database is searched for artists identified in the music library of the user.

12. The non-transitory computer readable medium of claim 9, wherein the customizing comprises automatically providing, without additional user input, the customized activity stream to the user.

* * * * *